April 12, 1932.  R. F. HATCH ET AL  1,853,861
GLASSWARE BLOWING MECHANISM
Filed March 13, 1928
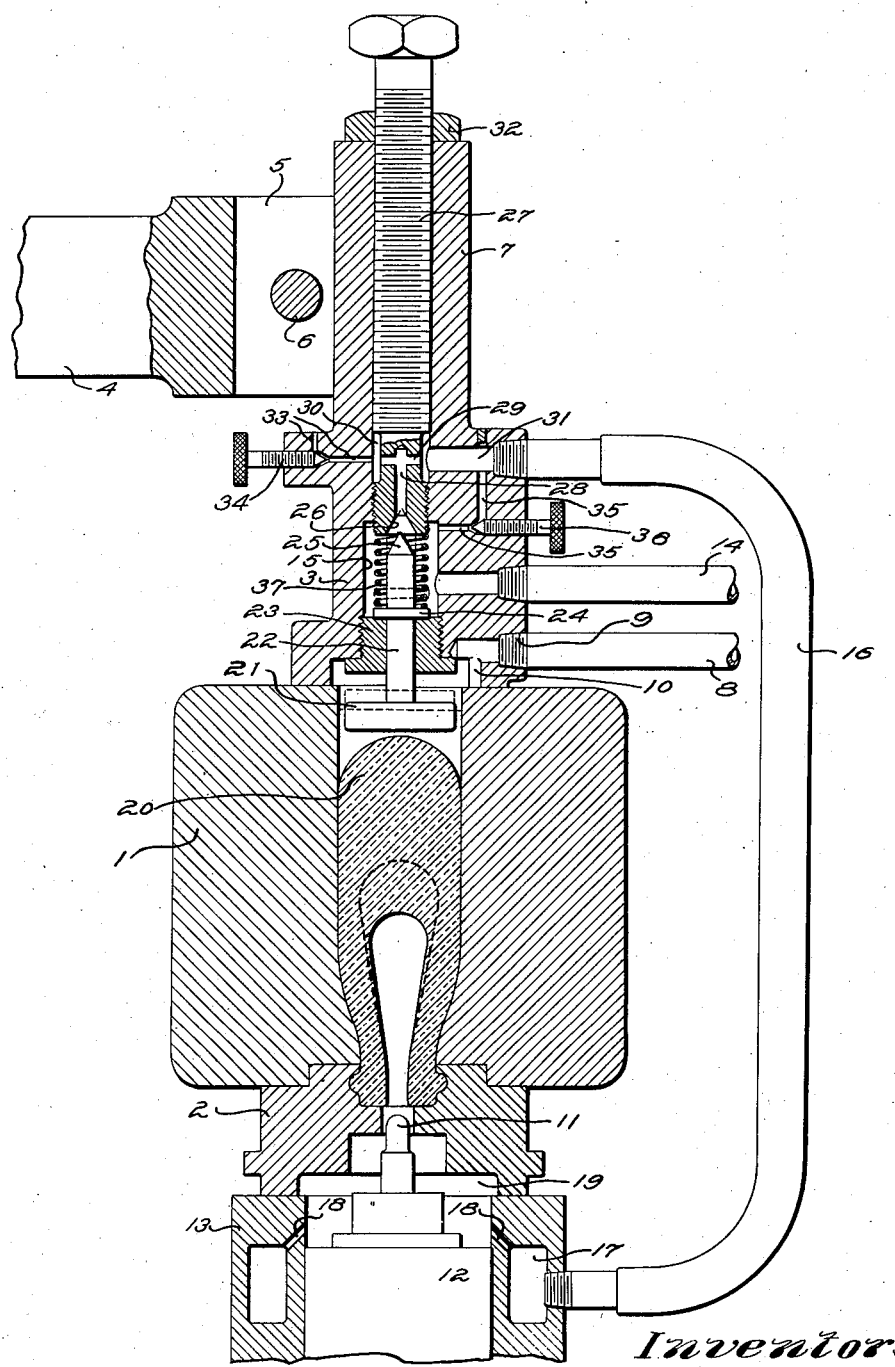
Witness:
Winslow B. Thayer
Inventors:
Roswell F. Hatch
Arthur B. Butterfield
by Robson D. Brown,
Attorney Patented Apr. 12, 1932                                                                1,853,861

UNITED STATES PATENT OFFICE

ROSWELL F. HATCH, OF WEST HARTFORD, AND ARTHUR B. BUTTERFIELD, OF HARTFORD, CONNECTICUT, ASSIGNORS TO HARTFORD-EMPIRE COMPANY, OF HARTFORD, CONNECTICUT, A CORPORATION OF DELAWARE

GLASSWARE BLOWING MECHANISM

Application filed March 13, 1928. Serial No. 261,332.

This invention relates to forming machines for glass containers, and more specifically to a means for blowing parisons as a part of the container forming process.

Among the objects of the invention are to provide a simple and compact device for the purpose of first settle-blowing a glass blank in a mold to form the neck or finish of the bottle, and then counterblowing the blank to form a parison.

A further object is to provide means for counterblowing a blank to form a parison in which there is provision for causing a predetermined elongation of the blank to terminate the counterblowing, specifically by closing a valve in the air line for the counterblowing air.

A further object of the invention is to provide a device of the character described in which there is provision for exhausting or relieving the pressure of the counterblowing air in the parison after the closing of the valve in the air line, so that building up of pressure in the parison due to the valve leaking or due to expansion of the air in the parison by heat, or both, is prevented.

A further object of the invention is to provide a means for sustaining a small pressure in the parison after the closing of the valve above referred to, whereby to prevent the collapsing of the walls of the parison after the automatically operated valve has closed. These last two means may be used differentially or alternatively for the purpose of determining the pressure in the parison after the closing of the automatically controlled valve.

This invention is an improvement on the device shown in the patent to the Hartford-Empire Company, No. 1,635,716, assignee of George E. Howard, the present invention including a more positive means of counterblow air shut off than that shown in the patent.

Other objects and advantages of the present invention will be apparent from a reading of the following specification and subjoined claims when taken in connection with the accompanying drawing, in which:

The single figure shows in substantially vertical section the combination of a mold and neck ring with settle-blow and counterblow heads and the automatic shut off valve and air controls forming the subject of the invention.

A parison mold, of the type made in two parts, is shown at 1 and is provided with the usual neck ring 2, also formed in two parts. A settle-blow head, generally indicated at 3, is mounted in an arm 4 suitably mounted in the blowing machine, means being provided for permitting the vertical adjustment of the head 3 as a unit with respect to the arm. These means may comprise a bifurcated end 5 on the arm 4, the two parts of which may be pressed together by a bolt 6 about the upper end or shank 7 of the head 3. Suitable means may be provided in the blowing machine for moving the settle-blow head 3 into operative position with respect to the mold 1, such means forming no part of the present invention.

Settle-blow pressure is supplied to the head 3 through a pipe 8 from any suitable source, the pipe being threaded into the head 3 as shown at 9 and communicating through the passages 10 in the head with the upper end of the mold cavity in the mold 1. Thus it will be seen that the settle blowing is accomplished by air pressure through the pipe 8 and passage 10 to the upper end of the mold cavity which settles the gob of glass into the neck ring 2. During this process, the neck pin 11 is in raised position to form the initial opening within the neck of the blank, this neck pin being suitably mounted on a plunger 12 which is vertically movable by any desired means within the counterblow head 13, which at this time is positioned against and in alignment with the neck ring 2.

Counterblowing pressure is conducted through the pipe 14 to a chamber 15 in the settle-blow head 3 where it is controlled by a suitable automatic valve, later to be described. From the head 3, this pressure is conducted through a suitable pipe system indicated diagrammatically at 16 to an annular chamber 17 in the counterblow head 13 from which it passes through a plurality of inclined passages 18 to a chamber 19 formed by the counterblow head 13, the neck ring 2 and the neck pin 11 and its associated plunger 12, the plunger being at its lower position, as shown in the drawing during the counterblowing process.

We show a means for cutting off the counterblowing pressure in response to a predetermined elongation of the parison 20 comprising a button 21, preferably of carbon, mounted on the lower end of a rod 22 which is loosely mounted for longitudinal movement in a plug or bushing 23 threaded into and forming the lower end of the chamber 15. The rod 22 is provided with a suitable collar 24 adapted to abut against the upper end of the bushing 23 and prevent the rod 22 moving completely out of its support. The upper end of the rod 22 is tapered as shown at 25 to form a valve which cooperates with a valve seat 26 formed in the lower end of a threaded bolt 27. When the valve 25—26 is open, the chamber 15 is in communication through the ducts 28 and 29 with an annular groove 30 formed in the bolt 27, and that, in turn, communicates through the duct 31 in the head 3 with the pipe system 16 above described. Thus it will be seen that as the counterblowing continues through the system of piping and ducts above described, the parison will elongate until its upper end contacts with the carbon button 21 and moves the valve rod 22 into the dotted line position shown in which the valve 25 is seated in the valve seat 26, shutting off the counterblow air.

If it is desired to produce a parison having a different elongation before the cut off of the counterblow occurs, this adjustment may be made by screwing the bolt 27 up or down in the shank 7, the bolt being locked in position by a suitable jam nut 32. This adjusts the vertical position of the valve seat 26 and consequently the point at which the cut off of the counterblowing air will be made upon elongation of the parison 20.

We preferably provide means for bleeding out the pressure of air within the parison after the valve 25 is closed to cut off the further admission of pressure thereto, comprising the bleeder passages 33 controlled by a suitable adjustable needle valve 34. This bleeding of the pressure after cut off may be useful in the event that the valve 25 does not seat properly or in the event that the heat of the parison causes the air to expand unduly, thus continuing the pressure beyond the desired time, or both.

Other means may be provided for sustaining the pressure within the parison after the automatic cut off has functioned, for the purpose of preventing the hot and semi-plastic walls of the parison from collapsing, this means preferably comprising passages 35 bypassing the valve and valve seat 25—26 and controlled by a suitable needle valve 36. It is clear that the bleeding passages 33 and the by-pass ducts or passages 35 may not be used simultaneously and to the same extent, as their functions are opposite. They may, however, be both incorporated into the same device as constructed and may be used alternatively or differentially, that is, by opening one valve more than the other so as to have the effect of one predominant, the adjustment of these valves being in the discretion of the operator, and being for the purpose of regulating the pressure in the parison after the closing of the valve 25.

In some instances, it may be desirable to provide additional means to retard the upward motion of the valve rod 22 to prevent the closing of the valve until the parison has expanded to substantially the full extent permitted by the uppermost position of the button 21, and for this purpose, we may provide a light spiral spring 37 between the collar 24 on the rod 22 and the lower end of the screw 27. This, in practice, insures the parison being blown to the dotted line position, shown in the drawings, before the valve 25 is closed to cut off the flow of blowing air.

Thus it will be seen that we have provided a simple and effective means for cutting off the counterblowing air pressure after a predetermined elongation of the parison, and also the necessary adjustments in connection therewith to provide for making ware of various characters. While we have shown and described but one embodiment of our invention, it is obvious that many modifications might be made therein without departing from the spirit of the invention as set forth in the appended claims, which are to be construed as broadly as the state of the prior art permits.

We claim:

1. Apparatus for making blown glass parisons comprising a mold, means for blowing the parison to cause it to expand in the mold, a control mechanism adapted to be engaged by the parison upon its elongation, means actuated by the control mechanism to cut off the supply of blowing air, and means for adjusting the control mechanism to vary the expansion of the parison.

2. Apparatus for blowing glass parisons comprising a mold, a head adapted to close the charge receiving end of said mold, means to supply air to said head to pack the charge in said mold, means for supplying counterblowing pressure to said parisons, means carried by said head for limiting the application of said counterblowing pressure, and means adjustable independently of said head for varying the action of said limiting means.

3. Apparatus for making glass parisons, comprising a mold, a blowing device adapted to be positioned in blowing relation to the neck forming end of said mold, a passage through which pressure is conducted to said device, a valve in said passage, an abutment member projecting into the end of said mold through which the charge of glass is introduced, and mechanical means interconnecting the abutment member and said valve, whereby the valve is closed in response to the elongation of said parison.

4. Apparatus for making glass parisons comprising a mold, a member adapted to be positioned adjacent to the charging end of said mold, means to conduct pressure to said member, a head adapted to be positioned in blowing relation to the neck forming end of said mold, a passage through which said pressure is conducted from said member to said head, a valve in said member controlling the passage of pressure therethrough, and a combined plunger and counterblow baffle for operating said valve extending into the mold cavity, whereby the blowing pressure is controlled by the elongation of the parison.

5. Apparatus for making glass parisons comprising a mold, a combined settle-blow head and counterblow shut-off device adapted to be positioned in operative relation to the charging end of said mold, separate means to conduct settle-blowing air and counterblowing air to said head, a counterblow head adapted to be positioned in blowing relation to the neck forming end of said mold, a passage through which blowing air is conducted from said settle-blow head to said counterblow head, a valve in the first named head controlling the passage of counterblowing air therethrough, a plunger mounted for longitudinal movement in said first named head, and a button at the outer end of said plunger against which the parison is adapted to bear upon elongation, said plunger also acting as a valve stem, whereby the valve is closed to cut off the flow of counterblowing air by a predetermined elongation of the parison being blown.

6. Apparatus for making glass parisons comprising a mold, a blowhead adapted to be positioned in blowing relation to the neck forming end of said mold, a passage through which blowing air is conducted to said head, a valve in said passage operable in response to elongation of the parison being blown, and means for varying the point of cut-off of the blow to permit varying amounts of parison elongation prior to the cutting off of the blowing air.

7. Apparatus for making glass parisons comprising a mold, a member adapted to be positioned adjacent to the bottom end of said mold, means to conduct air to said member, a head adapted to be positioned in blowing relation to the neck forming end of said mold, a passage through which air is conducted from said member to said head, a valve in said member operable in response to elongation of the parison being blown for controlling the passage of air therethrough, and means for adjusting the position of the valve seat to permit varying amounts of parison elongation prior to the cutting off of the blowing air.

8. Apparatus for making glass parisons comprising a mold, a member adapted to be positioned adjacent to the charging end of said mold, means to conduct air to said member, a head adapted to be positioned in blowing relation to the neck-forming end of said mold, a passage through which said air is conducted from said member to said head, a valve in said member controlling the passage of said air therethrough, and means for preventing the building up of pressure in said parison through leakage past said valve after it has been closed and for exhausting the pressure within said parison.

9. Apparatus for making glass parisons comprising a mold, a member adapted to be positioned adjacent to the charging end of said mold, means to conduct air to said member, a head adapted to be positioned in blowing relation to the neck-forming end of said mold, a passage through which said air is conducted from said member to said head, a valve in said member controlling the passage of said air therethrough, and means for admitting a small amount of air to said head after said valve has been closed to prevent the collapse of the semi-plastic walls of said parison.

10. Apparatus for making glass parisons comprising a mold, a member adapted to be positioned adjacent to the charging end of said mold, means to conduct air to said member, a head adapted to be positioned in blowing relation to the neck forming end of said mold, a passage through which said air is conducted from said member to said head, a valve controlling the passage of said air therethrough, a valved exhaust opening in said member through which pressure in said head may be exhausted, and a valved by-pass duct connecting the air passages on opposite sides of the first named valve, whereby the pressure in said parison may be a regulable amount, after the first named valve is closed.

11. Apparatus for making glass parisons comprising a mold, a combined settle-blow head and counterblow shut-off device adapted to be positioned in operative relation to the charging end of said mold, separate means to conduct settle-blowing air and counterblowing air to said head, a counterblow head adapted to be positioned in blowing relation to the neck-forming end of said mold, a passage through which counterblowing air is conducted from said settle-blow head to said counterblow head, a valve in the first named head controlling the passage of counterblowing air therethrough, a plunger mounted for longitudinal movement in said first named head, and a button at the outer end of said plunger against which the parison is adapted to bear upon elongation, said plunger also acting as a valve stem, the seat of said valve being adjustable, whereby the valve will be closed to cut off the flow of counterblowing air by a predetermined elongation of the parison being blown.

12. Apparatus for making glass parisons comprising a mold, a combined settle-blow head and counterblow shut-off device adapted to be positioned in operative relation to the charging end of said mold, separate means to conduct settle-blowing air and counterblowing air to said head, a counterblow head adapted to be positioned in blowing relation to the neck-forming end of said mold, a passage through which counterblowing air is conducted from said settle-blow head to said counterblow head, a valve in the first named head controlling the passage of counterblowing air therethrough, a plunger mounted for longitudinal movement in said first named head, a button at the outer end of said plunger against which the parison is adapted to bear upon elongation, said plunger also acting as a valve stem, whereby the valve will be closed to cut off the flow of counterblowing air by a predetermined elongation of the parison being blown, a valved exhaust opening in said first named head through which pressure in said counterblow head may be exhausted, and a valved by-pass duct connecting the air passages on opposite sides of the first named valve, whereby the pressure in said parison will be a regulable amount after the first named valve is closed.

13. Apparatus for making glass parisons comprising a mold, a vertically adjustable combined settle-blow head and counterblow shut-off device adapted to be positioned in operative relation to the charging end of said mold, separate means to conduct settle-blowing air and counterblowing air to said head, a combined counterblow head and neck pin device adapted to be positioned in operative relation to the neck-forming end of said mold, a passage through which counterblowing air is conducted from the first named head to said counterblow head, a vertically adjustable valve seat in said first named head, a plunger valve cooperating with said seat, the stem of which extends into the mold cavity and is provided at its end with a button for engagement with the parison being blown, whereby the counterblowing air will be cut off in response to a predetermined elongation of said parison, a valved exhaust opening connected with the air passage between said heads through which pressure in said counterblow head may be exhausted, and a valved by-pass duct connecting the air passages on opposite sides of the first named valve, whereby the pressure in the parison will be a regulable amount after the first named valve is closed.

Signed at Hartford, Connecticut, this 6th day of March, 1928.

ROSWELL F. HATCH.
ARTHUR B. BUTTERFIELD.